(12) United States Patent
Katsumura

(10) Patent No.: US 7,948,598 B2
(45) Date of Patent: May 24, 2011

(54) LIQUID CRYSTAL DISPLAY DEVICE AND MANUFACTURING METHOD THEREOF

(75) Inventor: Nobuhito Katsumura, Yokohama (JP)

(73) Assignee: Hitachi Displays, Ltd., Chiba (JP)

(*) Notice: Subject to any disclaimer, the term of this patent is extended or adjusted under 35 U.S.C. 154(b) by 689 days.

(21) Appl. No.: 11/626,934

(22) Filed: Jan. 25, 2007

(65) Prior Publication Data
US 2007/0206152 A1    Sep. 6, 2007

(30) Foreign Application Priority Data
Mar. 3, 2006   (JP) .................................. 2006-058117

(51) Int. Cl.
*G02F 1/1339*   (2006.01)
(52) U.S. Cl. .......................................... 349/153; 349/83
(58) Field of Classification Search .......................... None
See application file for complete search history.

(56) References Cited

U.S. PATENT DOCUMENTS

| 5,037,185 A | 8/1991 | Grupp |
| 6,531,329 B2 | 3/2003 | Asakura et al. |
| 7,505,108 B2 * | 3/2009 | Mochizuki ................... 349/153 |
| 2004/0160566 A1 | 8/2004 | Kawabe et al. |

FOREIGN PATENT DOCUMENTS

| JP | 57-171319 | 10/1982 |
| JP | 64-054420 | 3/1989 |
| JP | 02-113223 | 4/1990 |
| JP | 05-005890 | 1/1993 |
| JP | 2002-006325 | 1/2002 |
| JP | 2003-315810 | 11/2003 |

* cited by examiner

*Primary Examiner* — Lucy P Chien
(74) *Attorney, Agent, or Firm* — Antonelli, Terry, Stout & Kraus, LLP.

(57) ABSTRACT

Disclosed herein is a method of manufacturing a liquid crystal display device of dropping liquid crystals to be interposed between a first substrate and a second substrate to one of the substrates. The method includes a step of applying the sealant to one of the substrates where a region closed by the sealant is formed by a sealant on the main surface of the substrate, and, in this closed region, a liquid crystal filling region as a display region and a capturing region to the outer periphery of the liquid crystal filling region for intaking surplus liquid crystals or voids are formed.

6 Claims, 3 Drawing Sheets

FIG.2
(A)
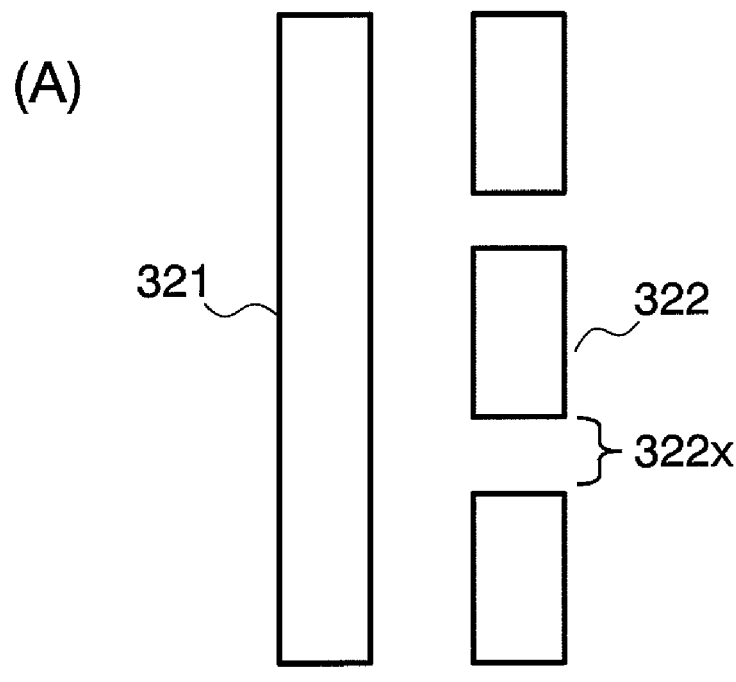
321
322
322x
(B)
321
322
(C)
321
410
322

LIQUID CRYSTAL DISPLAY DEVICE AND MANUFACTURING METHOD THEREOF

CROSS REFERENCES TO RELATED APPLICATIONS

The present application claims priority from Japanese application JP 2006-58117 filed on Mar. 3, 2006, the content of which is hereby incorporated by reference into this application.

BACKGROUND OF THE INVENTION

1. Field of the Invention

The present invention concerns a liquid crystal display device and a manufacturing method thereof.

2. Description of the Related Art

A known liquid crystal display device has a TFT substrate formed with thin film transistor (TFT) devices, a CF substrate formed with a color filter (CF) and liquid crystals interposed between a pair of the substrates. Further, as a method of filling liquid crystals to such a panel, an One Drop Filling (ODF) method has been known (refer to a Patent Document 1).

In the ODF method, a seal pattern is formed to one of substrates by a seal dispenser or screen printing. Then, a predetermined amount of liquid crystals is dropped to the substrate formed with the seal pattern, and another substrate is aligned and stacked and press bonded (i.e. combined) in vacuum.

Patent Document 1: Japanese Patent Laid-Open Publication No. 2000-315810

SUMMARY OF THE INVENTION

By the way, in the ODF method, fluctuation of the liquid crystal dropping amount gives a significant effect. Specifically, as the liquid crystal dropping amount increases more, the gap between the pair of substrates is enlarged and, on the other hand, as the liquid crystal dropping amount decreases, the gap is reduced. Further, where the dropping amount of the liquid crystals is excessive, they flow beyond the sealant (known as, the sealing material, also) to cause liquid crystal leakage. Further, where the dropping amount of the liquid crystals is insufficient, a portion not incorporated with the liquid crystals (voids) is left to cause display defects. Accordingly, in order to obtain a panel having a gap as desired, it is necessary to fill liquid crystals with no excess and insufficiency into a space surrounded with the sealant.

On the other hand, the cause for resulting excess and insufficiency of liquid crystals includes fluctuation of the dropping amount attributable to a dispenser (called "a dropping device," also), as well as fluctuation in the step on the substrate surface or fluctuation of the gap material, but it is difficult to control the fluctuation accurately.

The invention has been achieved in order to solve the foregoing subject and it intends to attain an ideal gap width at a higher accuracy even when the dropping amount of the liquid crystals fluctuates.

For solving the problem described above, it has been noted as: liquid crystal dropping (or dispensing) amount (V)=panel inner volume=area surrounded with seal pattern (S)×gap (H) in the invention. Then, for coping with the fluctuation of the liquid crystal dropping amount (V) while maintaining the gap (H) constant, the area (S) surrounded with the seal pattern is intentionally made variable. Thus, the seal pattern is made into a structure capable of absorbing surplus liquid crystals or voids.

A first aspect of the invention resides in a method of manufacturing a liquid crystal display device formed by interposing liquid crystals between a first substrate and a second substrate, which includes a sealant applying step of applying a sealant (a sealing material) to the first substrate, a liquid crystal dropping (or dispensing) step of dropping (or dispensing) liquid crystals in a region of the first substrate surrounded with the sealant, and a step of combining (bonding) the first substrate and the second substrate with (to) each other. Then, in the sealant applying step, a first seal frame and a second seal frame to the inside of the first seal frame are applied. At least a portion of the second seal frame is opened. In a case of forming the second seal frame by successively arranging plural sealant (seal material) films, the opening in the second seal frame is also referred to as a clearance (GAP) for spacing adjacent pair of sealant films.

The opening in the second seal frame may be formed such that the aperture ratio per unit range is smaller as it situates nearer to the liquid crystal dropping (or dispensing) position. Where the second seal frame is constituted, for example, with a plurality of sealant films arranged in a rectangular form, the gap for spacing each pair of adjacent sealant films is narrowed as it approaches the dropping position of the liquid crystals.

The opening in the second seal frame may be formed such that the aperture ratio per unit area is smaller as it situates nearer to the liquid crystal filling position.

Further, in the sealant applying step, the first seal frame and the second seal frame may be applied such that when the first substrate and the second substrate are combined with (bonded to) each other, the volume surrounded with the first substrate, the second substrate, and the first seal frame is equal with (or, equal to) the sum for the volume of the second seal frame and the maximum amount for the fluctuation of the liquid crystal dropping amount.

Further, in the sealant applying step, the second seal frame may be applied such that the volume inside the second seal frame is equal with (or, equal to) the minimum amount for the fluctuation of the liquid crystal dropping amount.

The second aspect of the invention is a method of manufacturing a liquid crystal display device formed by interposing liquid crystals between a first substrate and a second substrate, which includes a sealant applying step of applying a sealant to the first substrate, a liquid crystal dropping step of dropping liquid crystals to the inside surrounded with the sealant of the first substrate, and a step of combining (bonding) the first substrate and the second substrate with (to) each other. Then, the sealant applying step forms a region closed by the sealant on the first substrate, and forms a liquid crystal filling region as a display region and a capturing region on the outer circumference of the liquid crystal filling region for intaking surplus liquid crystals or voids within the closed region. A leakage channel is formed between the liquid crystal filling region and the capturing region such that the liquid crystals dropped in the liquid crystal filling region can flow out to the capturing region.

A third aspect of the invention is a liquid crystal display device manufactured by the method of manufacturing the liquid crystal display device described above.

A fourth aspect of the invention is a liquid crystal display device formed by interposing liquid crystals between a first substrate and a second substrate in which the sealant for sealing the liquid crystals includes a first seal frame and a second seal frame disposed to the inside of the first seal frame. Then, a space for intaking surplus liquid crystals or voids is formed between the first seal frame and the second seal frame.

BRIEF DESCRIPTION OF THE DRAWINGS

FIG. 1A to FIG. 1C are views for explaining a liquid crystal filling step according to the invention in which FIG. 1A is a plan view for a first substrate (main surface) just after the application of a sealant, FIG. 1B is a plan view for the first substrate just after the combining (bonding) for a second substrate with (to) the first substrate, and FIG. 1C is a plan view of the first substrate upon completion of the combining (bonding) between the first substrate and the second substrate, respectively;

FIGS. 2A and 2B show an upper plan view and a cross sectional view just after the application of a sealant to the first substrate respectively, and FIG. 2C shows a cross sectional view of a sealing material upon completion of the combining between the first substrate and the second substrate.

DETAILED DESCRIPTION

A method of manufacturing a liquid crystal display device to which a first embodiment of the invention is applied is to be described.

The manufacturing method of this embodiment has a feature in a liquid crystal filling step and, since known methods can be adopted for other panel manufacturing steps, explanation therefor is to be omitted.

In this embodiment, an ODF method is used as the method of filling liquid crystals. Then, the seal pattern in this case is devised.

Figure 1:
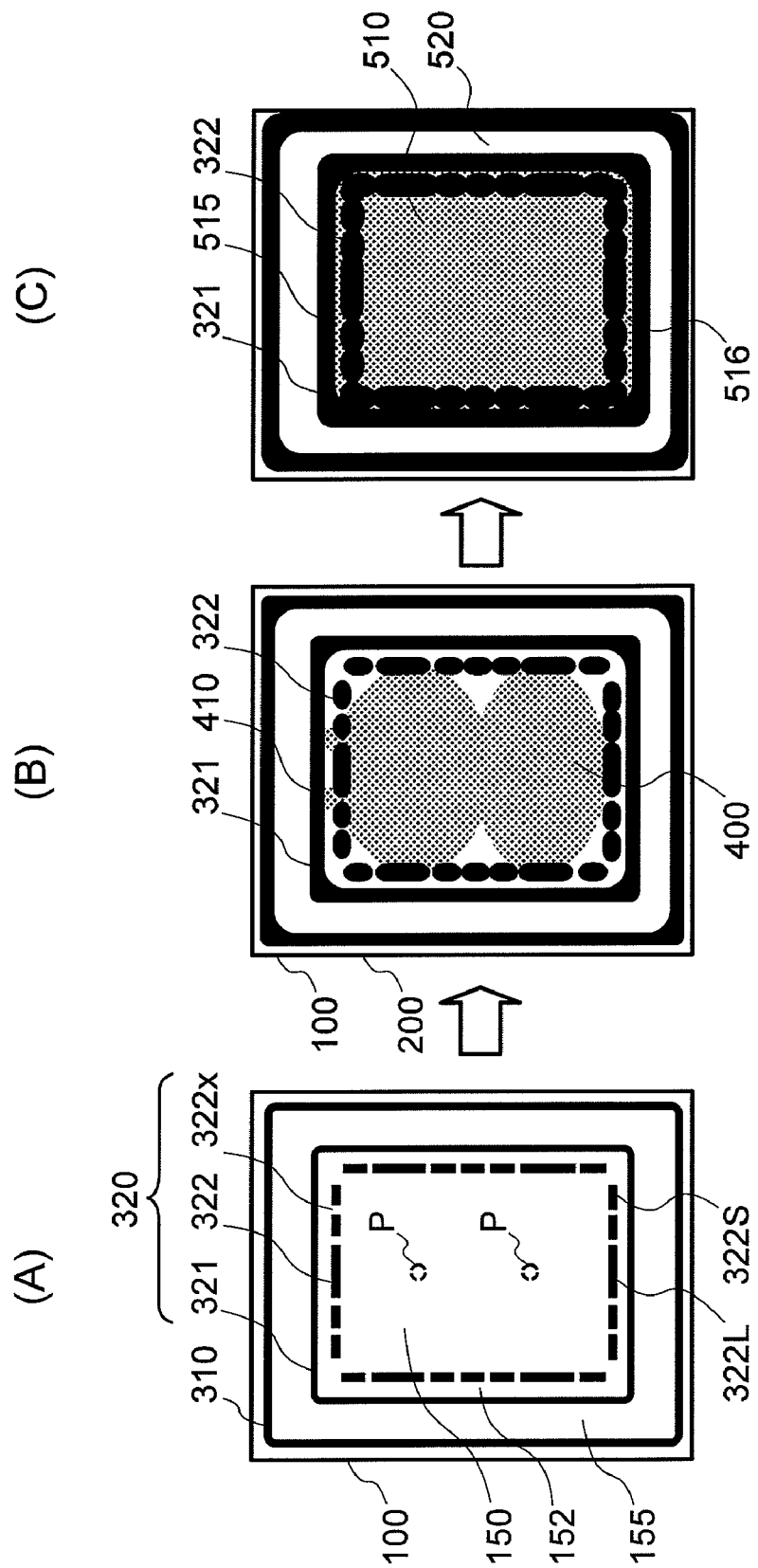

FIG. 1 is a view for explaining the liquid crystal filling step. In this embodiment, while a TFT substrate is described as a first substrate, and a CF substrate is described as a second substrate, they may be replaced with each other.

The manufacturing method of this embodiment is suitable to the manufacture of a small-sized panel tending to undergo the effect of the fluctuation for the liquid crystal dropping amount. Accordingly, the panel size (diagonal size) may be within a range from 0.8 to 12 inch. The substrate size is not restricted, and plural small panels can be attached to the main surface. Further, the seal pattern for combining (bonding) plural panels on the main surface of the substrate can be formed such that plural inner peripheral seal frames are surrounded with one outer peripheral seal frame.

A gap material (spacer) is disposed to the first substrate for properly maintaining the gap relative to the opposing second substrate.

At first, a sealant (a sealing material) is applied on a first substrate 100.

The sealant is a UV-ray curable adhesive. In this embodiment, while a method of using a seal dispenser or a screen printing method may be considered as a method of applying a sealant as will be described later, since it is necessary to form a spaced pattern (broken line) as will be described later, use of the screen printing method is preferred.

The sealant is printed on the first substrate by a seal pattern as shown in FIG. 1(A). The seal pattern includes an outer peripheral seal frame 310 along the outer edge of the first substrate 100 and an inner peripheral seal frame 320 at the inside of the outer peripheral seal frame 310.

The outer peripheral seal frame 310 is disposed so that the region 155 relative to the inner peripheral seal frame 320 is evacuated when the pair of substrates are combined with (bonded to) each other. Where the region 155 is evacuated, combining (press bonding) can be conducted reliably by utilizing an atmospheric pressure. The outer peripheral seal frame 310 is a portion which is cut out in a chamfering step and has a role substantially different from that of the inner peripheral seal frame 320 for sealing the liquid crystals. The outer peripheral frame 310 having such a function may be plurally provided.

The inner peripheral seal frame 320 is disposed so as to seal the liquid crystals 400 filled in a display region 150. The inner peripheral seal frame 320 includes a double frame and includes a first inner peripheral seal frame 321, and a second inner peripheral seal frame 322 at the inside of the first seal frame 321. A region surrounded by the second inner peripheral seal frame 322 forms a display region 150.

A portion between the first inner peripheral seal frame 321 and a second inner peripheral seal frame 322 forms a capturing region 152 for intaking surplus liquid crystals or voids.

An application pattern of the inner peripheral seal frame 320 is preferably such that a slight gap is left even after the completion of the combining between the first inner peripheral seal frame 321 and the second inner peripheral seal frame 322, in which surplus liquid crystals or voids are captured.

For this purpose, the sealant pattern for the first inner peripheral seal frame 321 is a rectangular closed line. The first inner peripheral frame 321 forms a so-called damp so that the dropped liquid crystals do not leak to the vacuum region 155.

The second inner peripheral seal 322 is in a broken line-like pattern. In other words, plural openings 322x are present in the second peripheral seal frame 322. The openings 322x form leakage channels through which the surplus liquid crystals dropped (or dispensed) at the dropping position P flow from the display region 150 to the capturing region 152.

While the second inner peripheral seal frame 322 is deformed by being crushed upon combining the pair of substrates with each other, it is preferred that the openings 322x are closed by the deformation. That is, the second inner peripheral seal frame 322 is applied preferably in such a pattern that broken lines are in continuous to each other by the deformation upon combining (bonding).

Further, where the pair of substrates are combined with each other, it is preferred that the volume (S1) surrounded with the first substrate 100, the second substrate 200, and the first inner peripheral seal frame 321 is equal with (or, equal to) the sum for the volume (V1) of the sealant forming the second seal frame 322 and the maximum amount (V2) for the fluctuation of the liquid crystal dropping amount (that is, S1=V1+V2). Thus, even where the liquid crystals are dropped with the maximum fluctuation amount, the liquid crystals do not leak out of the inner peripheral seal frame 320.

Further, in a case of combining the pair of substrates with each other, it is preferred that the volume inside the second seal frame 322 is equal with (or, equal to) the minimum amount for the fluctuation of the liquid crystal dropping amount. Thus, even where the liquid crystals are dropped with the minimum fluctuation amount, since the liquid crystals are filled with no excess or insufficiency in the display region surrounded with the second inner peripheral seal frame 322, the gap width W can approach the ideal state.

Further, it is preferred that the opening 322x in the second inner peripheral seal frame 322 has smaller aperture ratio per unit range as it approaches the liquid crystal dropping position P. The aperture ratio can be decreased by decreasing the number of the openings 322x or narrowing the opening. In the example of FIG. 1(A), while the pattern of the second inner peripheral seal frame 322 is drawn in a broken line shape, it is made continued long at a portion 322L near the filling position P and made continued shortly at the portion 322S remote from the dropping position P.

As described above, the aperture ratio per unit range is made not uniform so that only the excess portion of the dropped liquid crystals is driven off to the capturing region 152 after the crystals have been spread uniformly in the display region 150.

The dropped liquid crystals flow and prevail in a circular or elliptic shape around the dropping position P as the center. Therefore, the time the liquid crystals reach the inner peripheral seal frame 322 is different depending on the place. Accordingly, where the liquid crystals reaching sooner to the second inner peripheral seal frame 322 leak out instantly to the capturing region 152, the liquid crystals to be filled in the display region 150 may possibly be insufficient. Then, the aperture ratio per unit range is made smaller at a portion where the dropped liquid crystals reach sooner to provide a more effective function as a dam than in other portions.

FIG. 2(A) is an upper plan view of a pattern just after applying the sealant and FIG. 2(B) is a cross sectional view thereof. As shown in the drawing, just after applying the sealant, the sealant is in a raised state like a dome. In this state, the first inner peripheral seal frame 321 and the second inner peripheral seal frame 322 each has a line width, for example, within a range from 10 to 400 μm, and the raised height is about ⅓ to 1/20, for example, 1/10 of the line width. Further, the distance between the first inner peripheral seal frame 321 and the second inner peripheral seal frame 322 is, for example, within a range of 20 to 800 μm.

With a view point of reliably preventing the liquid crystal leakage, it is preferred that the line width of the first inner peripheral seal frame 321 is larger than the line width of the second inner peripheral seal frame 322.

Then, after printing the sealant, liquid crystals 400 are dropped and then the second substrate 200 is aligned and stacked in vacuum as shown in FIG. 1(B). The dropping position P is situated about at the center of the display region 150 so that liquid crystals prevail uniformly. Further also in a case of dropping the liquid crystals from plural positions, they are situated equally from the second inner peripheral seal frame 322.

When the pair of substrates are combined with each other and a pressure is applied gradually, the sealant is crushed and deformed. Further, the liquid crystals 400 prevail entirely in the display region 150 by the clamping force of the pair of substrates 100 and 200.

In this case, as shown in FIG. 1(B), surplus liquid crystals 410 leak through the openings 322x of the second inner peripheral seal frame 322 to the capturing region 152.

Further, when a pressure is applied till the gap between the pair of the substrates 100 and 200 reaches a predetermined value, the sealants 310 and 320 are further crushed and deformed as shown in FIG. 1(C).

The openings 322x of the second inner peripheral seal frame 322 are partially or entirely closed by such deformation. Further, the first inner peripheral seal frame 321 and the second inner peripheral seal frame 322 are joined partially.

After the completion of combining (bonding), an outer peripheral vacuum region 520, as well as a liquid crystal filling space 510 corresponding to the display region 150, a space 515 in which surplus liquid crystals 410 are intaken, and a space 516 which is closed before intrusion of the liquid crystals to form voids are formed being closed respectively between the pair of the substrates 100 and 200.

FIG. 2(C) is a cross sectional view for the state in which the applied sealant is crushed by the pair of substrates. The sealant is crushed, laterally widened, and flattened into a plate shape. The seal width is from 600 to 800 μm also including a gap portion in which the surplus liquid crystals 410 are intaken (about 100 μm).

After the completion of combining, UV-rays are irradiated and heating is further applied to completely cure the sealant thereby completing the panel filled with the liquid crystals.

The step of combining (bonding) the pair of the substrates and filling the liquid crystals has been described above. Subsequently, a liquid crystal display device is completed by known production processes (cleaning, chamfering step, polarizing plate appending step, etc.).

A method of manufacturing a liquid crystal display device according to an embodiment of the invention has been described above.

According to the embodiment described above, even when the liquid crystal dropping amount fluctuates, since the seal pattern makes the panel volume self-aligned corresponding thereto, the gap between the pair of substrates can easily approach to an ideal state. That is, even where the dropping amount is more "rough" compared with the existent method, a panel having a cell gap allowable as a specification can be manufactured. Further, there is neither liquid crystal leakage nor occurrence of voids on the display surface, and the yield is improved to attain a reduced cost.

EXAMPLE

An example of the present invention is to be described but the invention is not restricted thereto.

In this example, a small-sized liquid crystal display panel of 42 mm×31.5 mm with a 2 inch diagonal size was manufactured. Polystyrene beads of 4 μm diameter were used as a gap material.

At first, a UV-curable sealant was applied to a plain glass substrate formed with an orientation film by screen printing in a pattern shown in FIG. 1(A).

The first inner peripheral seal frame 321 and the second inner peripheral seal frame 322 each had a line width of 150 μm and a raised height of 15 μm. Further, the gap between the first inner peripheral seal frame 321 and the second inner peripheral seal frame 322 was 300 μm (refer to FIG. 2(B)).

Figure 3:
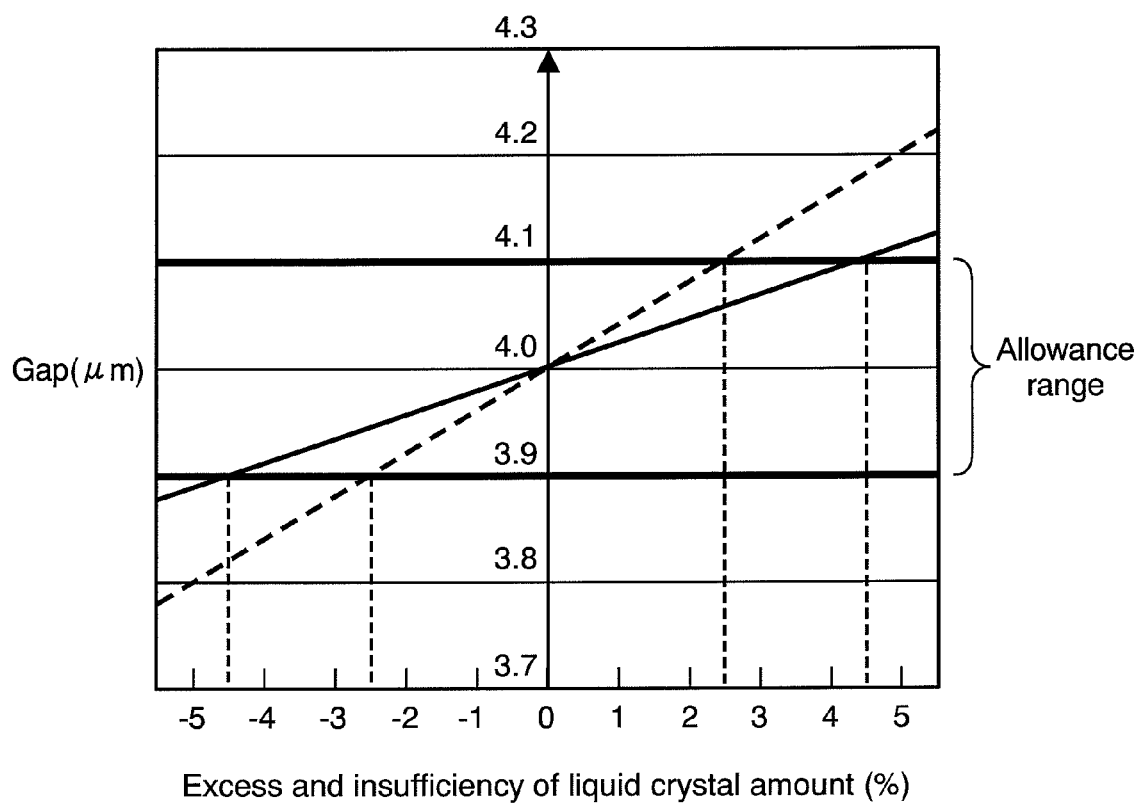
FIG. 3 shows a relation between excess and insufficiency of a liquid crystal amount supplied between the first substrate and the second substrate, and a gap width for spacing the substrates (main surface).

FIG. 3 shows a result of examining the change of the gap after completion of the combining (bonding) while changing the dropping amount of the liquid crystals. Excess and insufficiency of the liquid crystal dropping amount was defined as 0% when the gap was 4 μm upon combining the pair of substrates with each other. Further, a gap allowable for the specification is defined as within a range from 3.9 to 4.1 μm.

In the graph, a solid line shows a panel manufactured by this example. A broken line shows a panel manufactured by an existent method not provided with the second peripheral seal frame 322.

As shown in the graph, for defining the gap width within an allowable range, it is necessary to control the excess and insufficiency of the liquid crystal dropping amount within an extremely narrow range of from −2.5% to 2.5%.

On the other hand, in the manufacturing method according to the invention, it can be seen that the gap can be contained within an allowable range even when the excess and insufficiency of the liquid crystal dropping amount is in a wide range of from 04.5+4.5%. That is, according to this example, even where the dropping amount is more "rough" compared with that in the existent method, a panel having a gap allowable for the specification could be manufactured.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A method of manufacturing a liquid crystal display device formed by interposing liquid crystals between a first substrate and a second substrate, comprising:
   a sealant applying step of applying a sealant to the first substrate, wherein the sealant is a UV-ray curable adhesive,
   a liquid crystal dropping step of dropping liquid crystals to a region surrounded with the sealant of the first substrate, and
   a step of combining the first substrate and the second substrate with each other,
   wherein, in the sealant applying step,
   a first seal frame and a second seal frame inside of the first seal frame are applied and at least a portion of the second seal frame is opened, and
   wherein, in the step of combining,
   a capturing region is formed by the first seal frame and the second seal frame, where surplus liquid crystals and voids are encapsulated in the capturing region.

2. A method of manufacturing a liquid crystal display device according to claim 1, wherein the openings of the second seal frame are formed such that an aperture ratio per unit range close to the liquid crystal dropping position is smaller than an aperture ratio per unit range farther away from the liquid crystal dropping position.

3. A method of manufacturing a liquid crystal display device according to claim 1, wherein the sealant applying step applies,
   a first seal frame and a second seal frame such that when the first substrate and the second substrate are combined with each other, the volume surrounded with the first substrate, the second substrate, and the first seal frame is equal with the sum of the volume of the second seal frame and the maximum amount for the fluctuation of the liquid crystal dropping amount.

4. A method of manufacturing a liquid crystal display device according to claim 1, wherein
   the sealant applying step applies,
   a second seal frame such that when the first substrate and the second substrate are combined with each other, the volume inside the second seal frame is equal with the minimum amount for the fluctuation of the liquid crystal dropping amount.

5. A method of manufacturing a liquid crystal display device formed by interposing liquid crystals between a first substrate and a second substrate, comprising:
   a sealant applying step of applying a sealant to the first substrate,
   a liquid crystal dropping step of dropping liquid crystals to the inside surrounded with the sealant of the first substrate, and
   a step of combining the first substrate and the second substrate with each other,
   wherein the sealant applying step forms,
   by the sealant having a first sealant and a second sealant inside of the first sealant, a liquid crystal filling region as a display region of inside of the second sealant on the first substrate, and forms a capturing region between the first sealant and the second sealant for intaking surplus liquid crystals or voids,
   a leakage channel is disposed between the liquid crystal filling region and the capturing region, and
   in the step of combining the first substrate and the second substrate, the surplus liquid crystals or voids flow out to the capturing region from the liquid crystal filling region and are encapsulated in the capturing region.

6. A liquid crystal display device manufactured by the method of manufacturing the liquid crystal display device according to any one of claims 1 to 5.

* * * * *